United States Patent [19]

Creus

[11] 4,116,473
[45] Sep. 26, 1978

[54] PIPE COUPLING

[76] Inventor: José Humet Creus, Avenida Mosen Jacinto Verdiguer, 15 Santa Perpetua de Moguda, Barcelona, Spain

[21] Appl. No.: 738,465

[22] Filed: Nov. 3, 1976

[30] Foreign Application Priority Data

Nov. 4, 1975 [ES] Spain .................................. 216.609

[51] Int. Cl.² ............................................ F16L 39/04
[52] U.S. Cl. ...................................... 285/5; 285/111; 285/320; 285/232
[58] Field of Search ....................... 285/5, 6, 317, 320, 285/330

[56] References Cited

U.S. PATENT DOCUMENTS

| | | | |
|---|---|---|---|
| 2,256,845 | 9/1941 | Lanninger | 285/5 |
| 2,470,539 | 5/1949 | Wyss | 285/5 |
| 2,647,533 | 8/1953 | Beymer | 285/5 X |
| 2,822,190 | 2/1958 | Burke | 285/5 |
| 2,973,780 | 3/1961 | Coover | 285/5 |
| 3,391,899 | 7/1968 | Rundle | 285/5 |
| 3,439,939 | 4/1968 | Cornelius | 285/6 |

FOREIGN PATENT DOCUMENTS 1,169,850  11/1969  United Kingdom ........................ 285/5

Primary Examiner—Werner H. Schroeder
Assistant Examiner—Conrad L. Berman
Attorney, Agent, or Firm—Steinberg & Blake

[57] ABSTRACT

A pipe coupling, e.g. for use in irrigation pipelines, having releasably connectable male and female coupling coupling elements which are connected so as to be able to swing relative to each other about either or both of two axes extending transversely of the coupling elements and perpendicular to each other, whereby the elements are free to undergo universal relative angular movement when attached together. For this purpose one element is encircled by a loosely fitting ring, pivotally connected to that element by lugs at two diametrically opposite positions, and the other element has a pair of hooks, at diametrically opposite positions, which releasably engage sockets on the ring which lie on a diameter of the ring perpendicular to a diameter on which the lugs lie. The lugs may engage a pair of diametrically opposite seats on the one element, or an annular track in which case the couple elements are free to undergo relative rotation as well as relative angular movement.

10 Claims, 14 Drawing Figures

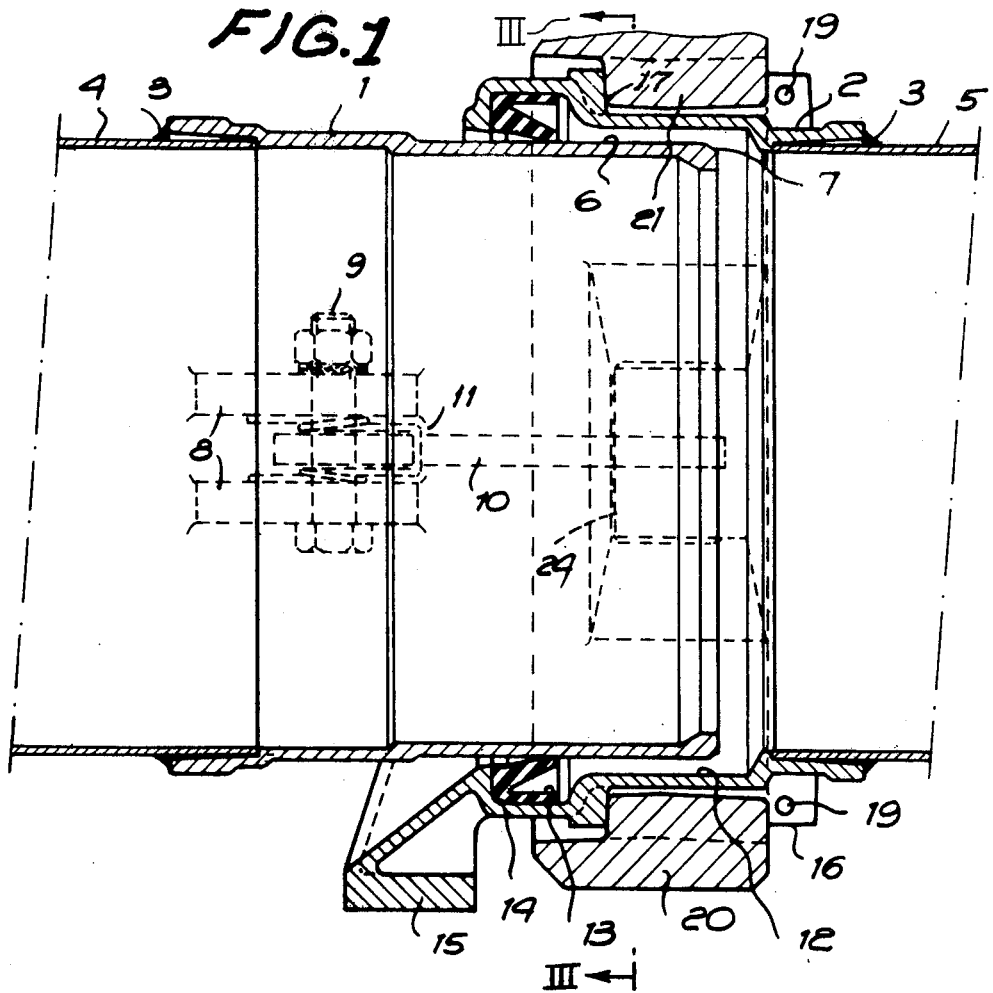
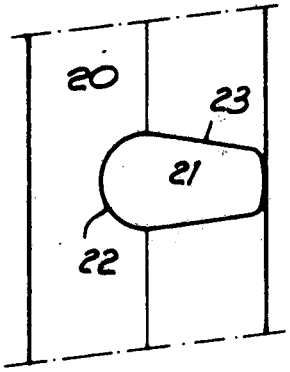

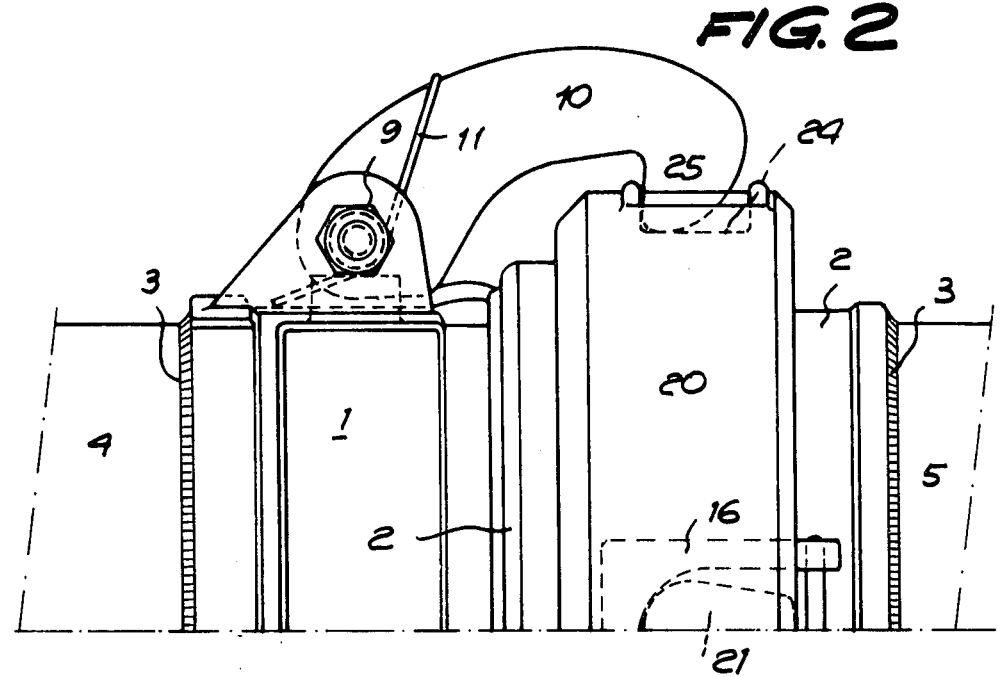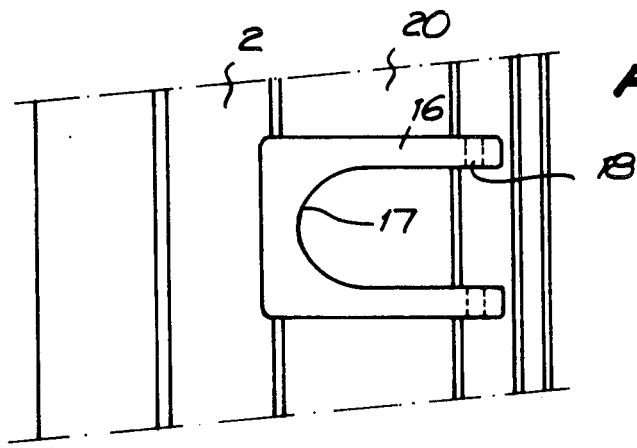

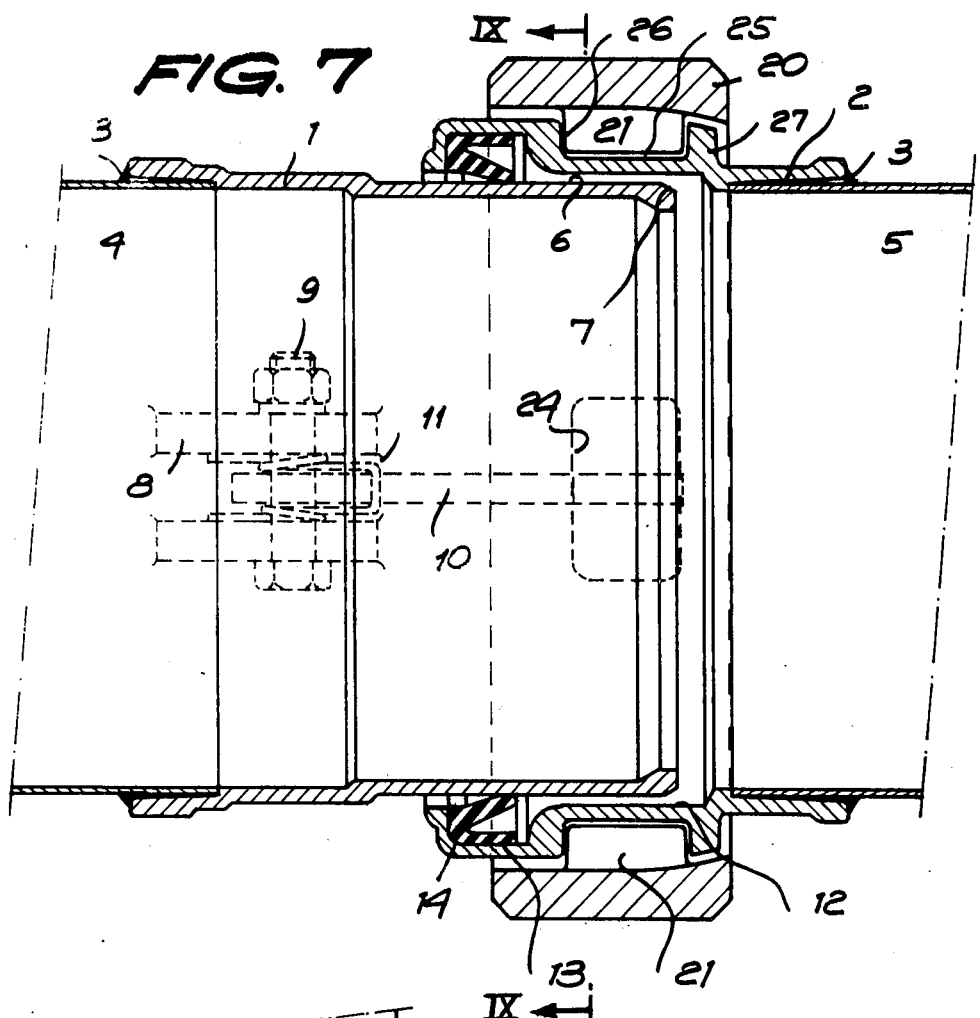
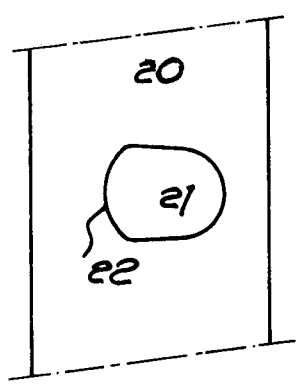

PIPE COUPLING

BACKGROUND OF THE INVENTION.

1. Field of the Invention.

The invention relates to detachable pipe couplings used on fluid carrying pipes, particularly but not exclusively water pipes such as are used in irrigation systems, and which are required to be readily capable of being coupled together and subsequently uncoupled.

2. Description of the Prior Art.

Various kinds of such pipe couplings are commercially available. As a rule, these are formed by two coupling elements which may form part of two pipe elements to be connected, one of the coupling elements being a female element which forms a socket and the other a male element having an end portion which can be loosely inserted into the socket formed by the female element, and sealed thereto by a resilient seal, preferably a lipped seal which closes under the pressure of the fluid being carried and allows the axes of the two members to be displaced slightly in relation to one another. The two elements also have attachment means for attaching the two elements together after the male end portion has been fitted into the female element and retaining them axially against the internal pressure of the fluid being carried, the attachment means being of a nature which can be readily actuated manually and generally being a pair of attachment means at positions diametrically opposite to each other. A large variety of such attachment means are commercially available. Such pipe coupling devices allow a limited amount of angular deflection of the axes of the two coupling elements relative to each other, and hence allow relative angular deflection of the axes of any pipe elements to which the coupling elements are fitted. However, although the use of a pair of attachment means at diametrically opposite positions allow limited relative angular movement in a plane perpendicular to a diameter extending between the attachment means, relative angular movement within the plane of that diameter results in an unequal distribution of the forces applied to the attachment means and this can be a serious disadvantage, especially in the case of pipes of large cross section carrying water at the high pressures customarily used.

SUMMARY OF THE INVENTION.

It is an object of the invention to solve this familiar problem by providing a novel coupling of the kind specified which permits universal relative angular deflection between the two coupling elements i.e. the axes can undergo relative angular deflection in any plane. A second object attained by some forms of the present invention is to provide a pipe coupling which allows relative axial rotation of its two coupling elements, and hence of any pipe sections attached to them. To achieve the first of these objects, in accordance with the present invention, the attachment means for releasably attaching a male and female element together comprises a ring loosely encircling a first one of the male and female elements; a pair of articulation means swingably connecting the first element and said ring and disposed diametrically opposite each other, said ring having a first diameter with said articulation means lying thereon; a pair of first engagement means on said ring disposed diametrically opposite each other, said ring having a second diameter with said first engagement means lying thereon; and a pair of second engagement means on the other of said male and female elements, said second engagement means also being disposed diametrically opposite each other and being engageable with respective ones of said first engagement means, swingable to attach said male and female elements together, said first and second diameters of said ring being perpendicular to each other, whereby said male and female elements are free to undergo universal relative angular movement when attached together.

Preferably, each said articulation means comprises a lug on said ring and extending inwardly therefrom and said first element has a seat disposed externally thereon said lug being swingable therein. Then, in one form of the invention, the first element has a pair of seats disposed externally thereon diametrically opposite each other, each with a cavity into which a respective said lug extends and is swingable therein, while to achieve the second object of the invention, the seat on the first coupling element is an external annular track encircling said first element, said track having a pair of opposed side walls bounding said track, and being respectively relatively nearer to and further from the terminal opening of said first element, said lugs of both articulation means extending into said track and being swingable and slideable therein whereby said ring can swing about its first diameter relative to said element and also rotate relative thereto.

Various mechanical arrangements can be used to allow the lugs of the articulation means to enter the track; in a preferred construction, the side wall of the track relatively further from the terminal opening of the said first coupling element has a pair of apertures through it diametrically opposite to each other for entry of the lugs.

Each said first engagement means may be a socket in said ring while each said second engagement means may be or may include a member, such as a pivotally mounted hook, releasably engageable in said socket.

BRIEF DESCRIPTION OF THE DRAWINGS.

FIG. 1 is a sectioned axial elevation of one form of pipe coupling;

FIG. 2 is a half-breadth plan view of the pipe coupling illustrated in FIG. 1;

FIG. 4. is a view, from the inside of the ring, onto one of the lugs connecting the ring to the corresponding coupling element;

FIG. 5 is a view onto one of the seats on that coupling element which receives one of the lugs illustrated in FIG. 4;

FIG. 7 is an axial sectioned elevation of a second form of pipe coupling;

FIG. 10 is a view, from the inside of the ring of the pipe coupling shown in FIG. 7 onto one of the lugs connecting the ring to the corresponding coupling element;

Figure 3:
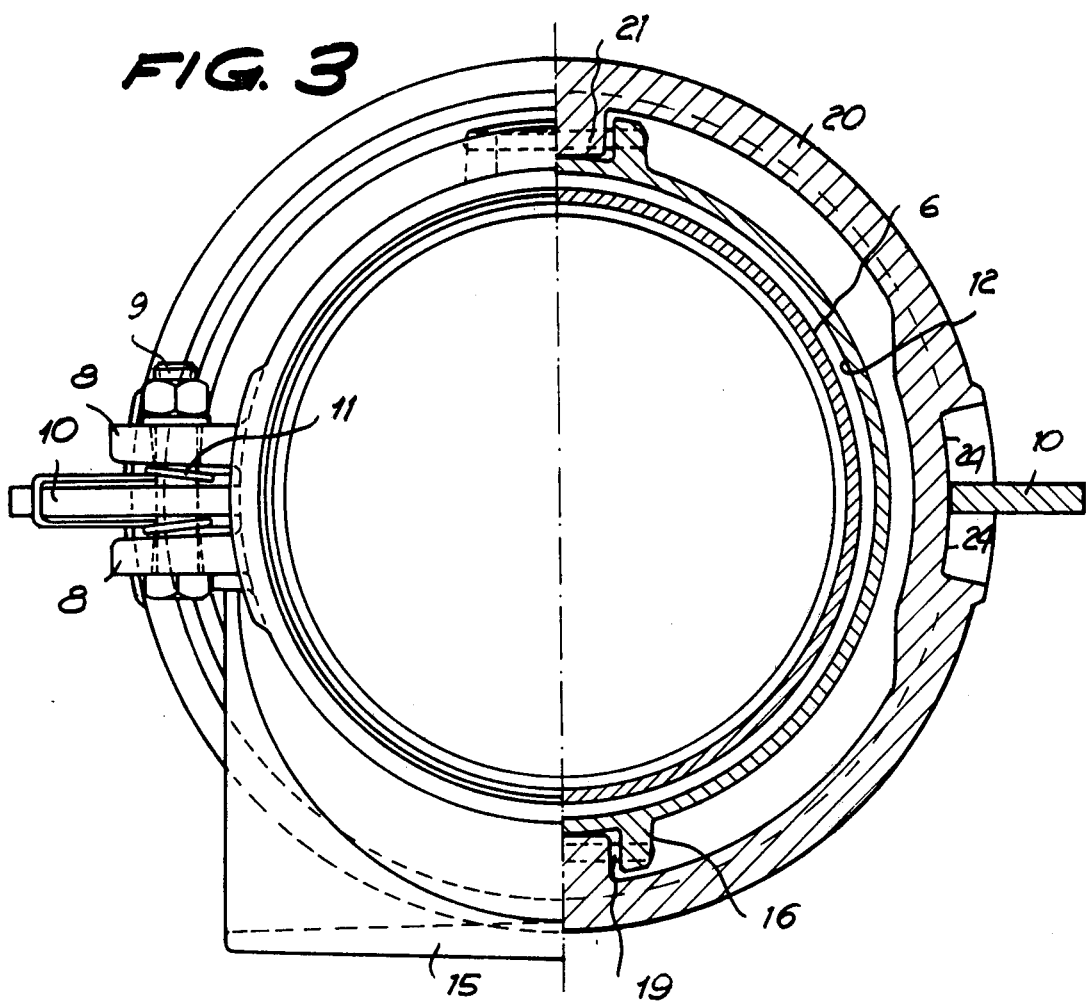
FIG. 3 is a front elevation, taken through the left hand end of FIG. 1, with the right hand half in section along the plane III—III in FIG. 1.
Figure 6:
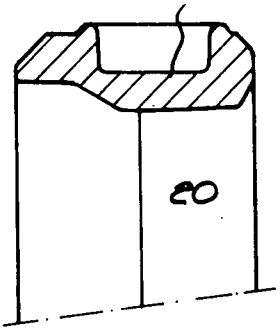
FIG. 6 is an axially sectioned detail of one of the sockets on the ring and which receives one of the coupling hooks of the other coupling element.
Figure 8:
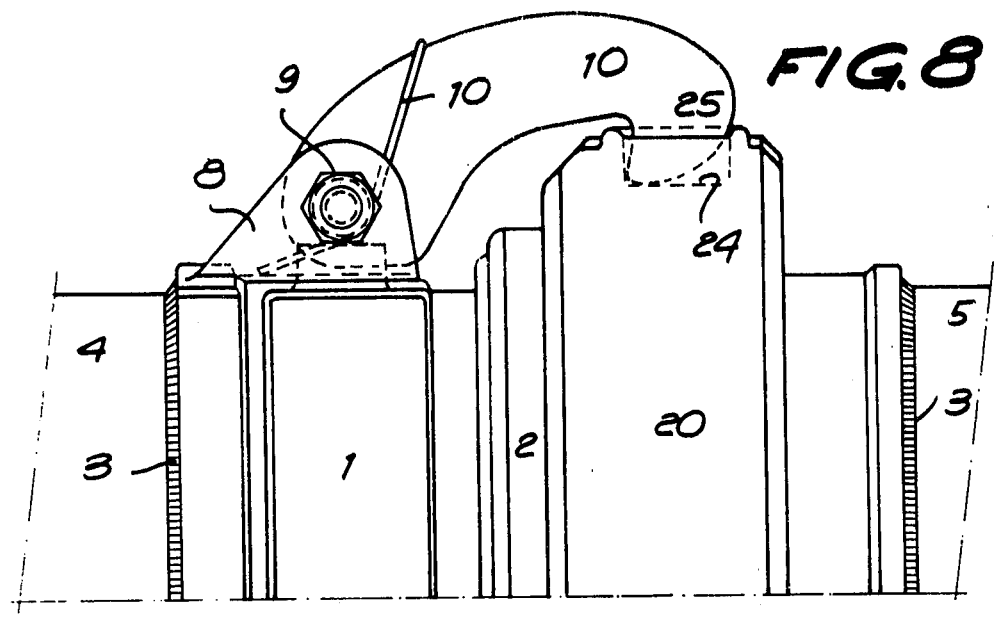
FIG. 8 is an axial half-breadth plan view of the pipe coupling illustrated in FIG. 7.

BRIEF DESCRIPTION OF THE PREFERRED EMBODIMENTS.

FIGS. 1 to 6 of the drawings show a pipe coupling element formed by a male element 1 and a female element 2, each of which is connected by a weld 3 to the end of a section of pipe 4 or 5 which form sections of a pipeline. However, either of the pipes 4, 5 or either of the elements 1, 2 could form part of some other item for conveying a fluid, or of a device supplying or receiving the fluid carried by a pipeline.

The male coupling element 1 has a generally smooth end portion 6 with a terminal entry opening bevelled at 7. At diametrically opposite positions on the male element 1 there are engagement means in the form of an assembly of a pair of lugs 8, a hook 10 received between the lugs, and a pivot pin 9 which attaches the hook to the pair of lugs. Each hook has associated spring means, in the form of a spring clip 11 also held by the pin 9. The spring clips 11 urge the hooks 10 towards each other.

The female coupling element 2 has a socket or bell end 12 extending to a terminal opening. Just inside this opening there is a annular internal groove 13 in which a double lipped sealing ring 14 is disposed.

The end portion 6 of the male element 1 can be inserted into the socket 12 of the female element 2 through the terminal opening of the latter. It fits loosely and the sealing ring 14 forms a hermetic seal to it. Around the lower half of the terminal opening of the end portion 12 of the female element 2 there is a bearing member 16 which serves to keep the pipes from rolling while they are being placed in position, and also facilitates entry of the male end portion 6.

Two projections 16 project from the outside of the female element 2, in diametrically opposite vertical directions. The projections 16 each define a U-shaped cavity with a rounded base 17 so as to form a cradle-like seat with the cavity opening away from the terminal opening of the element 2. Advantageously provided at the ends of the U are aligned transverse drill holes 18 in which a retaining pin 19 can be fixed.

A ring 20 loosely encircles the female coupling element 2, with some space between the ring 20 and the element 2. The ring 20 overlies the projections 16. Adjacent these projections the ring 20 has two lugs 21, for connecting it to the element 2. The lugs 21 extend inwardly from the ring 20 to be received in the seats provided by the U-shaped cavities defined by the projections 16. The shape of these lugs is shown in FIG. 4. Each of the lugs has an end oriented towards the terminal opening of the element 2 and which is rounded, as indicated at 22, to correspond to the rounded base 17 of the cradle-like seat formed by the cavity in a projection 16, and in which the lug is received. The rounded parts 17 and 22 allow the ring 20 to swing freely around an axis extending through the centres of curvature of these rounded parts. The flanks 23 (i.e. the opposite side surfaces) of the lugs converge towards each other away from the rounded end 22, this convergence increasing the freedom of the ring 20 to swing. This swing is limited by abutment of the flanks 23 with the side surfaces of the U-shaped cavities defined by the projections 16. As can be seen from FIGS. 1 and 2, the ring can be mounted on the female coupling element 2 from the end opposite to the terminal opening, i.e. along the pipe 5, so that its lugs enter the cavities in the projections 16 where they can then be retained by the pins 19.

The outer face of the ring 20 has, at diametrically opposite points, engagement means in the form of a pair of recessed sockets 24 of suitable shape to allow the tips 25 of the hooks 10 to engage in them, as seen in FIG. 2, with freedom to swing about a diameter of the ring on which the sockets lie. The spring clips 11 urge the hooks 10 towards each other and hence, urge the hooks into engagement with the sockets 24. The sockets 24 are at positions 90° around the ring 20 from the projections 16 and lugs 21, i.e. the diameter of the ring on which the lugs 21 lie is perpendicular to the diameter on which the sockets 24 lie.

Figure 11:
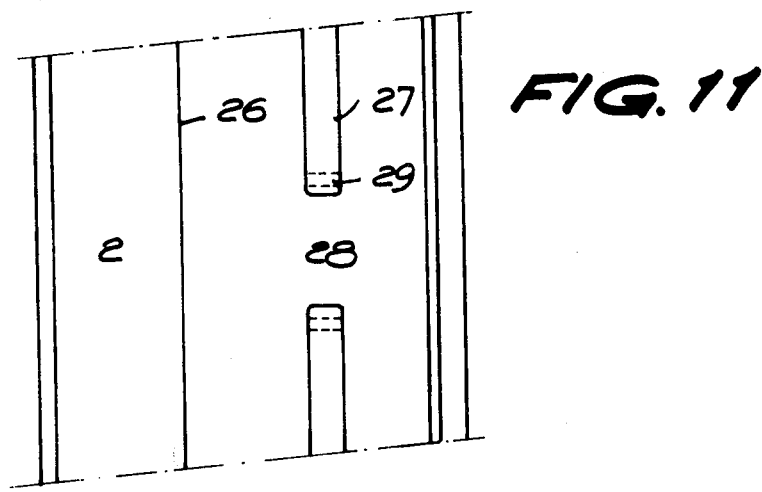
FIG. 11 is a side view of a portion of the female coupling element of the pipe coupling shown in FIG. 7 showing one of the apertures receiving the lugs of the ring.
Figure 9:
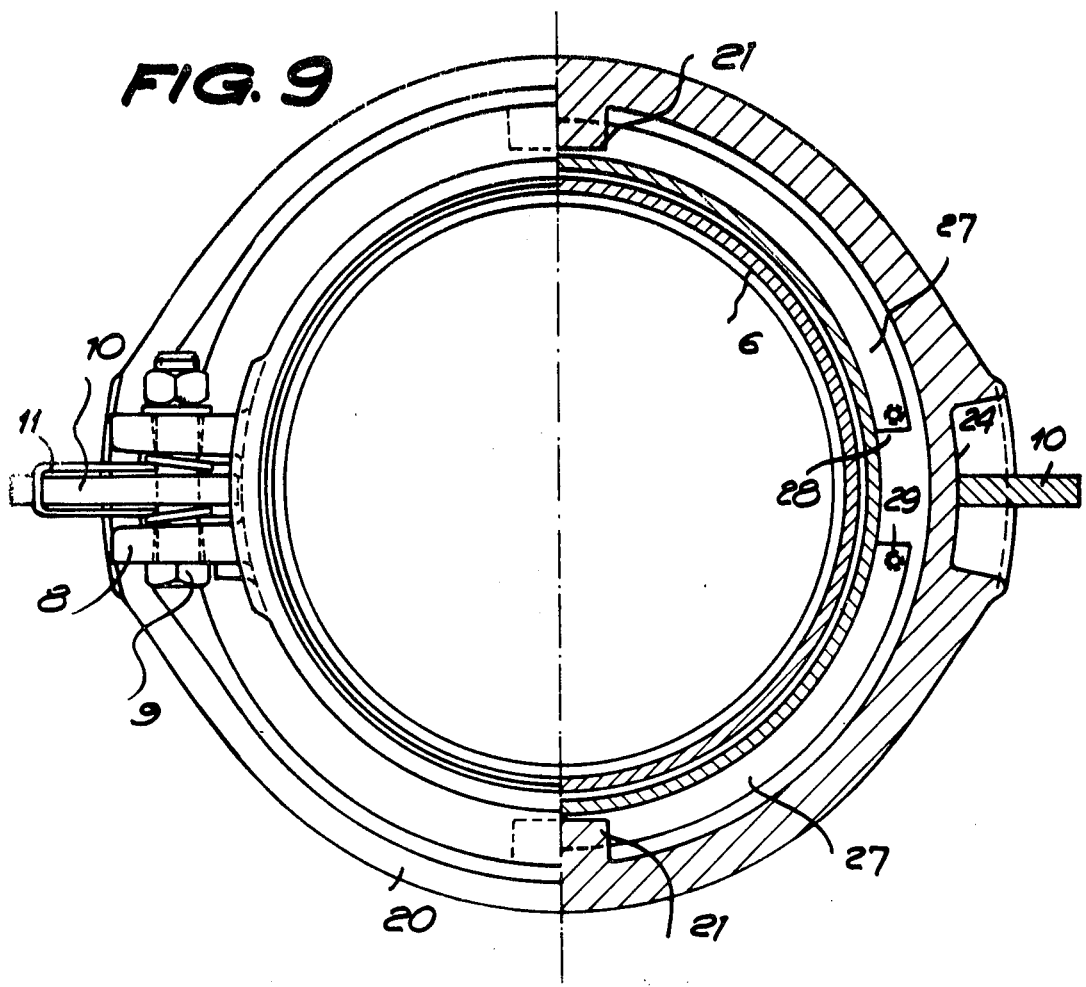
FIG. 9 is a front elevation taken through the left hand end of FIG. 7 with the right hand half sectioned along the plane IX—IX in FIG. 7.
Figure 12:
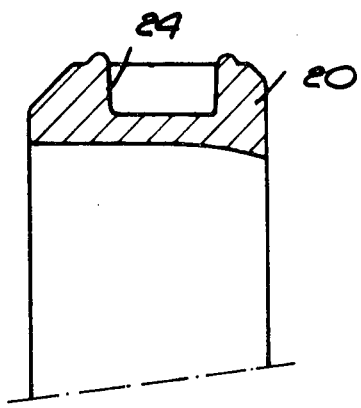
FIG. 12 is an axial section through one of the sockets of the ring of the pipe coupling shown in FIG. 7, and which receives one of the coupling hooks of the other coupling element.

Once the male end portion 6 has been fitted into the aperture of the sealing ring 14 and the hooks 10 are fitted to the sockets 24, it is enough to urge the element 1 in the direction of the element 2 to obtain the assembly position shown in the drawings. The clearance provided by the lipped seal assembly allows the elements 1 and 2 to undergo relative deviation from axial alignment by moving in a vertical plane, i.e., around a horizontal diametral axis extending through the sockets 24 in which the tips 25 of the hooks 10 engage, but a similar freedom of movement is also obtained around the vertical diametral axis extending through the cavities defined by the projections 16, since the hooks and the ring assembly which receives them can swing around that vertical axis, thus the elements 1 and 2 are free to undergo universal relative angular movement when attached together. FIGS. 7 et seq. of the drawings show a construction which is essentially the same as that shown in FIGS. 1 to 6 except that coupling element 1 is able to rotate around the longitudinal axis of the element 2. For this purpose the socket 12 of the female element 2 has a cylindrical outer surface forming the floor of an external annular track in which the lugs 21 can slide. The track is bounded by a side wall 26 formed by the internal groove 13 which houses the sealing ring 14 and by a side wall provided by a collar 27. The side wall 26 is relatively nearer to, and the side wall provided by the collar 27 is relatively further from the terminal opening of the element 2. In this case, the lugs 21 have a somewhat different shape, as can be seen in FIG. 10, although they still have the rounded end 22 as a fulcrum for swinging movement and which bears against the side wall 26 of the annular channel. For the entry of the lugs 21 into the annular track there are provided (FIGS. 9 and 11) two diametrically opposite apertures 28 in the collar 27, such apertures being closable by means of bridges (not shown) which can be fixed in the drill holes 29.

Figure 13:
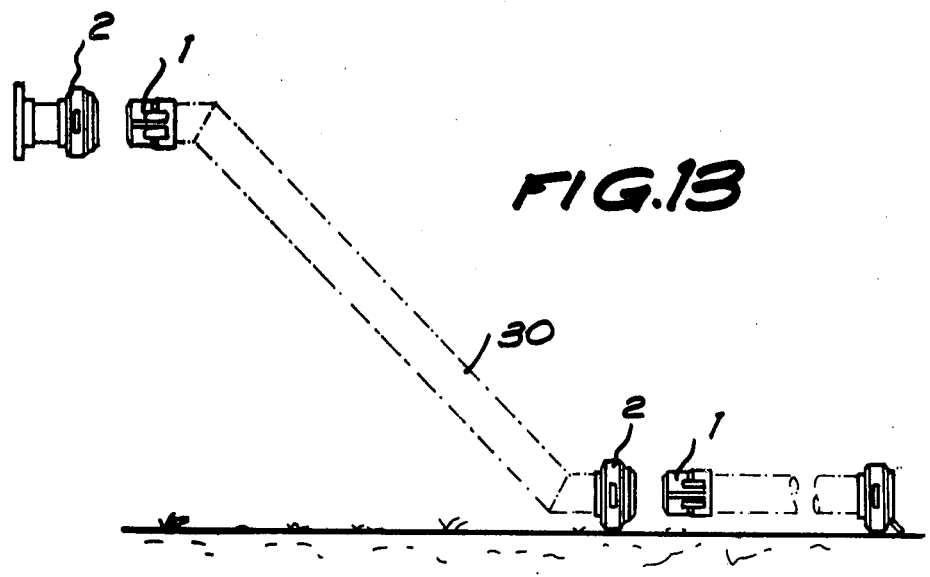
FIG. 13 is a side elevational view showing an application of the pipe coupling shown in FIG. 7.
Figure 14:
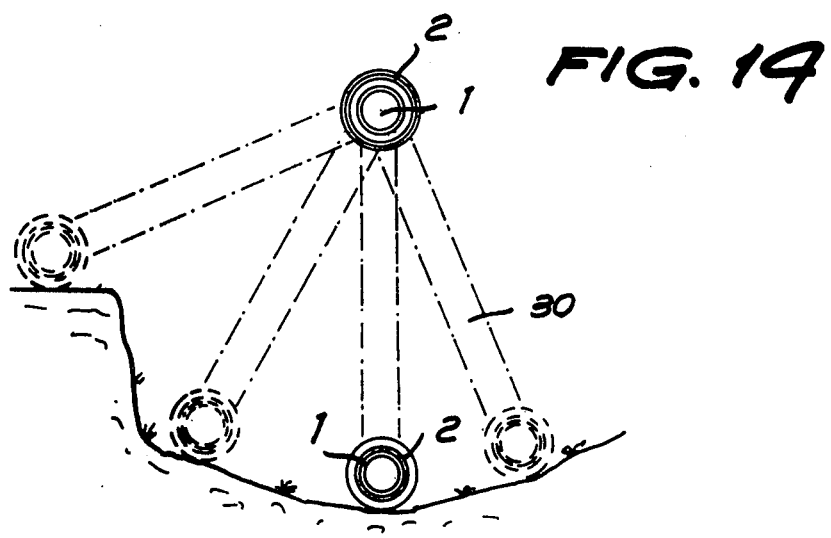
FIG. 14 is a front elevational view corresponding to FIG. 13.

A use of this rotary pipe coupling is illustrated by FIGS. 13 and 14. Considerable differences in the level of the ground can be tolerated using zig-zag pipe sections 30 whose ends have coupling elements 1, 2 of a single unified type.

I claim:

1. A pipe coupling for fluid carrying pipes comprising male and female coupling element respectively terminating in open ends, said male coupling element extending with clearance into said female coupling element so that the latter has an inner surface surrounding and spaced from an outer surface of said male coupling element and defining with said outer surface an annular gap, sealing means operatively connected with said elements for fluid-tightly sealing said gap while providing for tilting of said elements, one relative to the other, within the limits of the clearance therebetween, and attachment means operatively connected with said elements for releasably attaching them to each other, said attachment means including a ring loosely surrounding one of said coupling elements, a pair of diametrically opposed articulation means operatively connected between said ring and said one element for connecting said ring to said one element for swinging movement with respect thereto about a first swing axis extending through said pair of articulation means and perpendicularly across a central axis of said one coupling element, said attachment means further including two pairs of engagement means, one of said pairs of engagement means being diametrically opposed to each other and situated at said ring along a second swing axis which is perpendicular to said first swing axis and said central axis of said one coupling element, both of said swing axes being situated in a plane normal to said central axis of said one coupling element, and the other of said pairs of engagement means being carried by the other of said coupling elements respectively in axial alignment with said one pair of engagement means and respectively engaging said one pair of engagement means for swingably connecting said coupling elements to each other for swinging movement one relative to the other about said second swing axis, whereby said male and female coupling elements are free to undergo a universal relative angular movement when attached together.

2. The combination of claim 1 and wherein at least one of said surfaces which defines said gap is formed with a groove, and said sealing means including a resilient, lipped sealing ring situated in said groove.

3. The combination of claim 1 and wherein said one pair of engagement means include portions of said ring which are respectively formed with sockets, said other pair of engagement means respectively including members which are releasably engageable in said sockets.

4. The combination of claim 3 and wherein said other pair of engagement means respectively include hooks pivotally connected to said other coupling element, and a pair of spring means respectively engaging said hooks for urging them respectively into said sockets.

5. The combination of claim 3 and wherein each of said other pair of engagement means includes a pair of lugs spaced from each other and fixed to and extending from said other coupling element, a hook having a portion situated between said lugs, a pivot pin passing through said lugs and hook for attaching the latter pivotally to said lugs, and a pair of spring clips respectively engaging said hooks and urging them toward each other for urging said hooks at portions thereof distant from said lugs respectively into said sockets.

6. The combination of claim 1 and wherein each articulation means includes a lug fixed to said ring and extending inwardly therefrom toward said one coupling element, and the latter coupling element having at its exterior a seat which receives said lug, the latter being swingable in said seat.

7. The combination of claim 6 and wherein each seat is formed with a cavity into which said lug extends and in which said lug is swingable.

8. The combination of claim 6 and wherein each lug has a convexly curved end surface directed toward the open end of said one coupling element and a pair of opposed side surfaces extending from said convexly curved end surface and converging toward each other.

9. The combination of claim 6 and wherein said one coupling element is formed at its exterior with a circumferential groove defining an annular track, said track having a pair of opposed annular side walls circumferentially surrounding said one coupling element, and said lugs of said ring extending into said track while being circumferentially movable therein during circumferential turning of said ring with respect to said one coupling element, whereby said coupling elements can turn one relative to the other about their common axis while at the same time being swingable one relative to the other at said first and second swing axes.

10. The combination of claim 9 and wherein one of said side walls of said track is situated more distant from the open end of said one coupling element than the other of said side walls, and said one side wall being formed with a pair of apertures through which the lugs of said ring may pass for entry into said track.

* * * * *